United States Patent [19]

Rehrig

[11] Patent Number: 4,865,338

[45] Date of Patent: Sep. 12, 1989

[54] CONTAINER WITH REINFORCING RING

[75] Inventor: Houston Rehrig, Pasadena, Calif.

[73] Assignee: Rehrig International, Inc., Richmond, Va.

[21] Appl. No.: 177,453

[22] Filed: Apr. 4, 1988

[51] Int. Cl.$^4$ .............................................. B62B 3/02
[52] U.S. Cl. .................................. 280/33.992; 220/71
[58] Field of Search ................. 280/33.99 R, 33.99 A, 280/33.993, 33.99 H, 33.997; 220/71, 72.1, DIG. 15

[56] References Cited

U.S. PATENT DOCUMENTS

| | | | |
|---|---|---|---|
| D. 209,865 | 1/1968 | Rehrig et al. | D58/5 |
| 3,341,060 | 9/1967 | Rehrig et al. | 220/73 |
| 3,390,808 | 7/1968 | Rehrig et al. | 220/71 |
| 3,419,182 | 12/1968 | Gildart | 220/73 |
| 3,445,034 | 5/1969 | Rehrig | 220/97 |
| 3,622,037 | 11/1971 | Gildart | 220/73 |
| 3,999,774 | 12/1976 | Rehrig | 280/33.99 R |
| 4,123,077 | 10/1978 | Joseph | 280/33.99 R |
| 4,273,346 | 6/1981 | Rehrig | 280/33.998 |
| 4,619,371 | 10/1986 | Rehrig | 220/71 |

Primary Examiner—Charles A. Marmor
Assistant Examiner—Richard Camby
Attorney, Agent, or Firm—Banner, Birch, McKie and Beckett

[57] ABSTRACT

The present invention is directed to a plastic container having a reinforcing ring disposed around its upper edges to provide additional strength. The reinforcing ring is preferably formed of a cross-sectionally round wire which is obtained from a coil, straightened, cut, and bent to suitable dimensions. If desired, the reinforcing ring may have its ends welded together and the ring may extend around the entire top opening. The reinforcing ring is disposed within a peripheral outwardly facing channel of the shopping cart basket, crate, or other container. The channel includes top and bottom walls and an inner side wall. The reinforcing ring is free of projections that engage the walls of the channel. The channel has retaining ridges and/or a plurality of resilient discrete projections which retain the reinforcing ring and enable the reinforcing ring to be snap-actingly receivable within the channel.

52 Claims, 2 Drawing Sheets

CONTAINER WITH REINFORCING RING

TECHNICAL FIELD

The present invention relates to an improved reinforcing ring and retaining structure for carts, crates, and other storage containers. More particularly, the present invention relates to a reinforcing ring that is free of projections and which snap-actingly fits within a channel disposed along the top opening of plastic shopping carts, milk crates, and storage containers.

BACKGROUND OF THE INVENTION

Carts having a frame and a basket used in supermarkets are commonplace. Ideally, carts of this type should have the following characteristics. First, they should be able to withstand a great deal of abuse, particularly to the basket portion. Carts are continuously impacted with each other and with stationary objects. Second, the carts should be easy to push and to maneuver. The condition of the wheels has a great effect on this characteristic as does the weight of the cart. Third, the carts should be of such design and surface finish to avoid a propensity to collect dirt and contaminants. Fourth, the carts should be able to withstand cleaning by strong detergents or steam. Fifth, the carts usually must have sides of open lattice construction, because customers wish to be able to observe the contents of the carts from any angle. Sixth, the carts should be attractive and should maintain their attractivenesss over a long period of time.

Carts with metal baskets do not satisfy all of these requirements. The wires in the baskets are welded at the crossing points, and the basket is chrome-plated to provide a smooth, cleanable, attractive surface. Because the welding and plating process is intricate, it is common to have welds and plating of marginal quality so that, upon hard impact or upon a series of impacts over a period of time, the welds and plating are broken. The plating is also subject to being removed by wear and scraping against other objects. This allows the base metal to rust. Also, if the basket is used in an environment where corrosion of metals is a problem, such as in grocery stores, the base metal exposed at the broken plating and broken welds will corrode. The cart, and particularly the basket, then becomes unsightly and unattractive. At these exposed points, food particles can become entrapped in small cracks and crevices despite periodic cleaning, yielding unsanitary carts. In addition, articles placed in the basket can become pinched or snared by the unsecured wires and plating, inconveniencing the customer and damaging to the goods. Impacts also frequently inwardly deform the basket, giving rise to all of the above problems.

Repair of metal cart baskets is a problem because it is difficult to bend the wires back into shape, and it is difficult and expensive to reweld and replate the wires. The cart frame and the basket are often integral with each other and therefore cannot easily be taken apart for repair or replacement of components. To replace the basket, welds must be broken, then replaced. Complicated bending and interlocking of wires frequently is necessary during disassembly and assembly. Usually, the cart is simply not required. When it becomes too unsightly or too unsanitary to use it is discarded. The loss of the entire cart for the sake of basket is uneconomical. Metal carts are also quite heavy, making them difficult to push and to maneuver, especially if they have some malfunction of the wheels.

Carts having plastic baskets have been used to overcome many of the disadvantages of metal basket carts. Such a cart is disclosed in my U.S. Pat. No. 3,999,774 entitled "Cart With Plastic Basket." In such carts the frame is preferably made of chrome plated steel construction and the cart basket is made of plastic, such as polyethylene. This basket is strong, light-weight, has a smooth finish, and can deform to absorb impact and then return to its original shape. The sides, front and bottom of the plastic baskets are integrally molded in one piece. There are no seams to break, or cracks and crevices to collect dirt. The plastic does not rust or corrode under the influence of food acids and other chemicals. The use of a plastic basket reduces the weight of an average cart by at least fifteen pounds.

The plastic basket is formed almost entirely of open lattice construction, which further lightens it, and which allows the basket contents to be viewed from any angle. Rigidity is provided to the basket by suitable integral strengthening ribs, and also by the interrelationship between the basket and the metal cart frame, and other components.

It is very important to have a strong basket that will withstand impact and high loading. Therefore, the basket must be provided with reinforcement. Some reinforcement is provided by way of the construction of the basket itself. But the weight of the basket is kept to a minimum, and its strength maximized, by novel relationships between the metal cart frame and the basket which use the metal cart frame as a reinforcing member for the basket. Not only does this provide added strength to the plastic basket, but it allows the basket to be made of materials that would otherwise not be suitable.

In the '774 patent, a metal ring is disposed within a channel extending around the top opening of the upper edges of the basket. The metal ring is provided with a plurality of integral upstanding tabs which are received in complementary openings in the top wall of the channel. The tab and slot arrangement secures the ring within the channel. Similar reinforcing rings may be used with over-the-counter carts (see my U.S. Pat. No. 4,273,346) and with scanner carts (see my U.S. Pat. No. 4,650,199).

Plastic crates, such as plastic milk crates, are also well known in their field. Plastic crates replace wooden and paper crates for transporting, storing and displaying food such as milk cartons. These crates are rectangular and include four side walls and a bottom. The side walls are commonly formed of an open lattice configuration to permit viewing the contents of the crate. The bottom is also formed of an open lattice configuration to prevent accumulation of debris. Various reinforcing structures such as integrally molded ribs are used to strengthen the crates. It is also known, as disclosed in my U.S. Pat. No. 3,390,808, to dispose a metal reinforcing ring within a channel disposed along the top opening of the crate. As with reinforcing rings for shopping carts, the metal ring is provided with upstanding tabs or lugs which project into flanges in the plastic crate to secure the metal ring in position.

However, in both carts and crates, the tab and slot method of securing the reinforcing ring in the top channel suffers numerous disadvantages. Tabs must be formed on the reinforcing ring. A cross-sectionally round ring must be used for the cart basket gate to swing and to complete the back side of the ring. The ring must be formed with dies.

SUMMARY OF THE INVENTION

It is an object of the present invention to provide a cart, crate, or other container having a plastic basket and a reinforcing ring that overcomes the disadvantages associated with tab and groove securing means.

It is another object to provide a reinforcing ring without tabs, that may be bent to shape, that is easier to assemble and dispose in a securing channel, and that is easier to maintain.

These and other objects are attained by the container with a reinforcing ring according to the present invention. The reinforcing ring is preferably formed of a cross-sectionally round wire which is obtained from a coil, straightened, cut, and bent to suitable dimensions. If desired, the reinforcing ring may have its ends welded together and the ring may extend around the entire top opening. The reinforcing ring is disposed within a peripheral outwardly facing channel of the shopping cart basket, crate other container. The channel includes top and bottom walls and an inner side wall. The reinforcing ring is free of projections that engage the walls of the channel. The channel has retaining ridges and/or a plurality of resilient spaced discrete projections which retain the reinforcing ring and enable the reinforcing ring to be snap-actingly receivable with the channel.

Various additional advantages and features of novelty which characterize the invention are further pointed out in the claims that follow. However, for a better understanding of the invention and its advantages, reference should be made to the accompanying drawings and descriptive matter which illustrate and describe preferred embodiments of the invention.

DETAILED DESCRIPTION OF PREFERRED EMBODIMENTS

Figure 1:
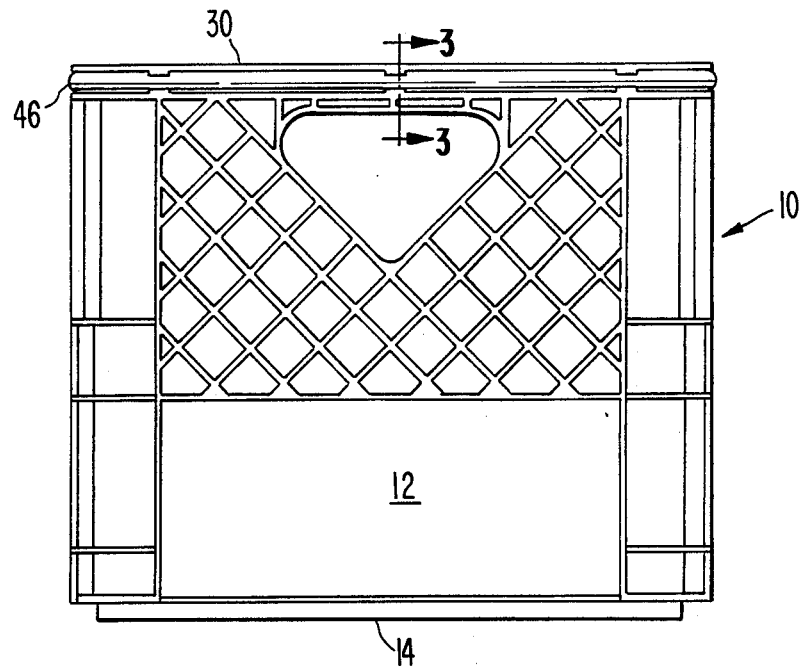
FIG. 1 is a side view of a milk crate illustrating the reinforcing ring in position.
Figure 2:
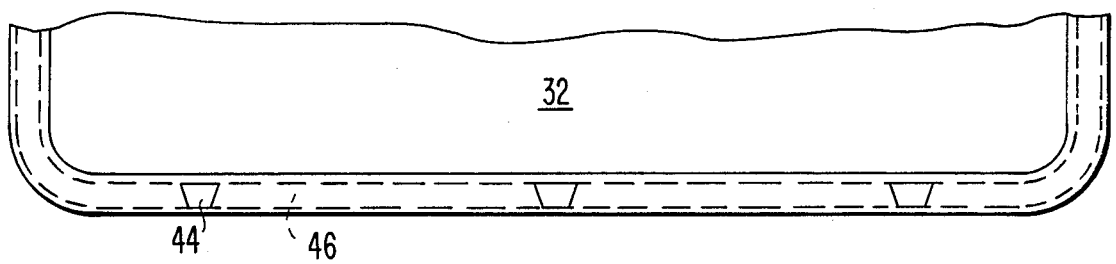
FIG. 2 is a partial top view of the milk crate of FIG. 1.
Figure 3:
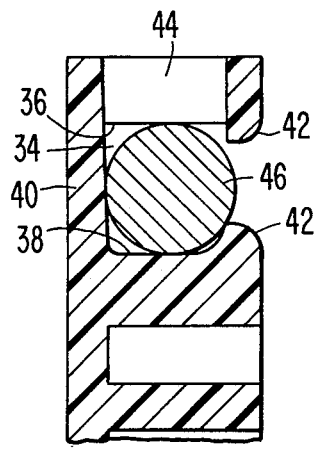
FIG. 3 is a sectional view taken along line 3—3 of FIG. 1.

Referring first to FIGS. 1 and 2, milk crate 10 according to the present invention is shown. Milk crate 10 has four side panels 12 joined to bottom panel 14.

Figure 4:
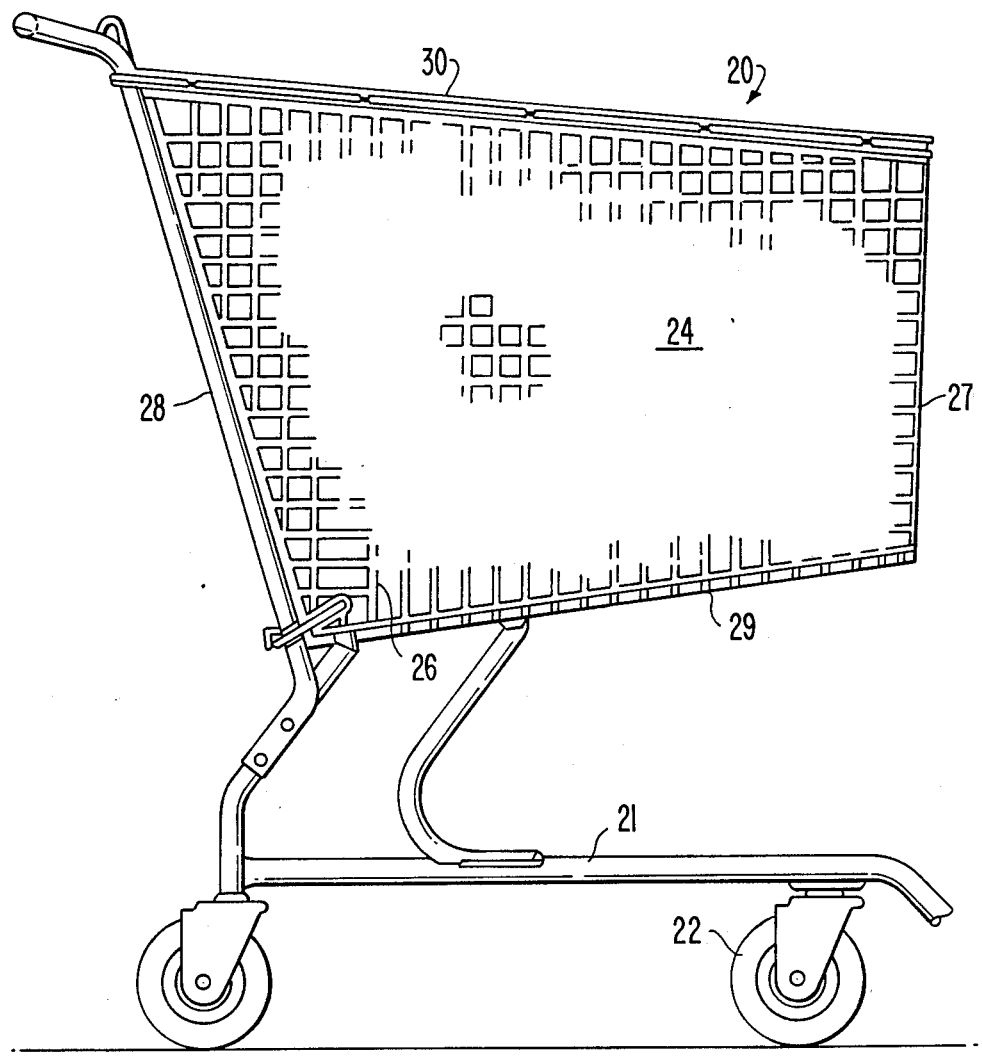
FIG. 4 is a side view of a shopping cart illustrating the reinforcing ring in position.

Referring to FIG. 4, shopping cart 20 according to the present invention is shown. Shopping cart 20 has metal cart frame 21 on which wheels 22 are mounted. Plastic basket 24 is mounted on cart frame 21. Plastic basket 24 includes two side panels 26, front panel 27, back panel 28, and bottom panel 29. Side panels 26, front panel 27, and bottom panel 29 are attached to each other and may be formed integrally. Back panel 28 is optional and is formed as a separate component. Although only a conventional shopping cart is shown, the present invention also may be used with shopping carts of various sizes and configurations, such as, for example, over-the-counter and scanning shopping carts.

The remaining elements of the reinforcing top frame invention are common to both the milk and crate and the shopping cart embodiments. These elements also may be used with other plastic containers. Side panels 12 of milk crate 10 and side, front, and back panels 26, 27, 28, respectively, of shopping cart 20 have top edges 30 which define top opening 32 into the container. Top opening 32 of milk crate 10 is substantially rectangular and top opening 32 of shopping cart 20 is substantially trapezoidal.

Disposed below the outer faces of top edges 30 is a substantially rectangular securing channel 34. As shown in FIG. 1, channel 34 extends around the entire periphery although channel 34 need not extend around the total periphery, depending on the amount of required additional strength. Channel 34 has top wall 36 and opposing bottom wall 38, connected by inner side wall 40. Channel 34 is substantially U-shaped.

Channel 34 is provided with a plurality of resilient spaced discrete projections 42 which are molded in and formed integrally with channel 34, and which protrude upwardly from bottom wall 38 and downwardly from top wall 36. Projections 42 partially obstruct the opening into channel 34. Top projections 42 are aligned with and oppose bottom projections 42. Each top projection 42 is mounted opposite a respective bottom projection 42. In one alternate embodiment, channel 34 may be formed with only one continuous projection 42. Continuous projection 42 may be disposed on either top wall 36 or bottom wall 38. In another embodiment only one continuous projection 42 is disposed on either top wall 36 or bottom wall 38.

Figure 5:
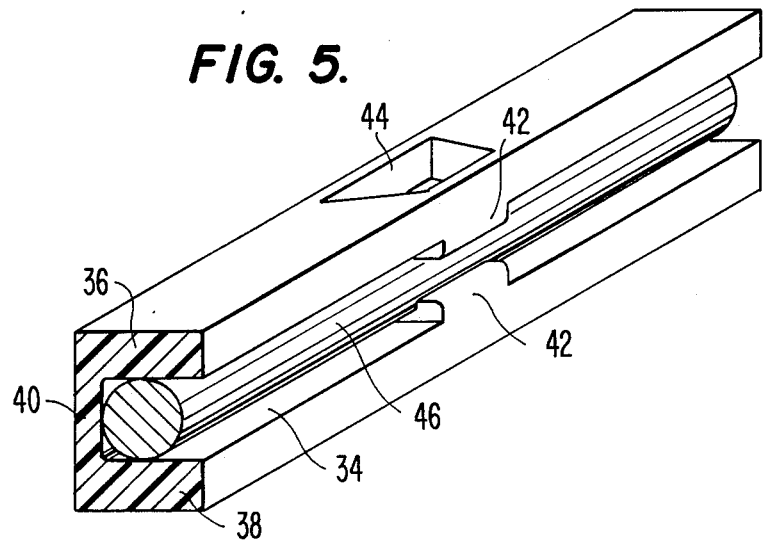
FIG. 5 is a perspective view of the reinforcing ring disposed within its retaining channel.

Channel 34 is also provided with a plurality of quadrilateral openings 44 disposed in top wall 36. Quadrilateral openings 44 are formed to enable the molding of projections 42. The inner lengthwise edge of quadrilateral opening 44 is coplanar with inner side wall 40 as best shown in FIG. 5. The length of the outer lengthwise edge of quadrilateral opening 44 is substantially equal to the length of projections 42. Quadrilateral openings 44 are disposed along top wall 36 at the same locations as projections 42. Quadrilateral openings 44 preferably are shaped as trapezoids. However, any shape will suffice as long as the length of the outer lengthwise edge is shorter than the length of the inner lengthwise edge. Forming the outer lengthwise edge shorter facilitates and simplifies the molding process, enabling portions of the mold to move more freely.

Metal reinforcing ring 46 is disposed within channel 36 to provide strength and rigidity to the lightwight plastic container. Reinforcing ring 46 has a uniform cross section that is preferably circular. Reinforcing ring 46 therefore can be manufactured simply by cutting a length of wire from a coil, straightening the wire, cutting the wire, bending the wire to its required configuration, and welding the ends together (if the wire extends around the entire periphery of top opening 32). In an efficient factory, these operations are automatic and the labor costs in manufacturing reinforcing ring 46 are minimal.

Reinforcing ring 46 is formed so that it has a uniform cross section. Reinforcing ring 46 may alternately be formed so that it has different cross-sectional areas or different cross-sectional configurations along different portions of top edges 30. Nonetheless, even in this embodiment, reinforcing ring 46 has a uniform cross section in the area of projections 42. Thus, reinforcing ring 46 is formed so that it is free of projections that engage—frictionallly, matingly, or otherwise—any portion of channel 34. The device for retaining reinforcing ring 46 within channel 34 is disposed on or adjacent channel 34 in the form of projections 42. No additional device is disposed on, or is formed as part of, reinforcing ring 46. Thus, reinforcing ring 46 is snap-actingly received within channel 34 and is held in position by projections 42. Reinforcing ring 46 is totally receivable within channel 34.

Preferably, the maximum clearance between each pair of opposed projections 42 disposed on top and bottom walls 36, 38 is 65% of the height of reinforcing ring 46. Where projections 42 are disposed on one wall of channel 34 only, or do not have an opposing projection 42 on the opposite wall, the clearance between each projection 42 and its opposing wall should also be no greater than 65% of the height of reinforcing ring 46. Also, the width of quadrilateral openings 44 is preferably less than the width of reinforcing ring 46.

Numerous characteristics, advantages, and embodiments of the invention has been described in detail in the foreoing description with reference to the accompanying drawings. However, the disclosure is illustrative only and the invention is not limited to the precise illustrate embodiments. Various changes and modifications may be effected therein by one skilled in the art without departing from the scope or spirit of the invention.

I claim:

1. A plastic reinforced container comprising:
   a quadrilateral bottom panel;
   four side panels extending upwardly from said bottom panel and having top edges defining a top opening into said container;
   a reinforcing ring extending around at least a portion of the outer periphery of said container adjacent said top edges; and
   securing means integrally formed with said side panels for securing said reinforcing ring to said side panels;
   wherein said reinforcing ring is free of projections that engage said securing means;
   wherein said securing means comprises a peripheral outwardly facing channel disposed below said top edges, said channel comprising a top wall, a bottom wall, an inner side wall, and at least one projection integrally formed with said channel and particularly obstructing the opening into said channel;
   wherein said reinforcing ring is free of projections that engage said top, bottom, and inner side walls of said channel;
   wherein said reinforcing ring is snap-actingly receivable within said channel behind said projection; and
   wherein said channel comprises a plurality of discrete projections.

2. A plastic reinforced container according to claim 1 wherein said reinforcing ring is totally receivable within said channel.

3. A plastic reinforced container according to claim 1 wherein said projections are resilient and are integrally formed on both said top wall and said bottom wall of said channel.

4. A plastic reinforced container according to claim 1 wherein the clearance past said projections for passage of said reinforcing ring into said channel is not greater than 65% of the height of said reinforcing ring.

5. A plastic reinforced container according to claim 3 wherein the said projections formed on said top wall of said channel are aligned with and oppose said projections formed on said bottom wall of said channel.

6. A plastic reinforced container according to claim 5 wherein the clearance between each pair of opposed projections is not greater than 65% of the height of said reinforcing ring.

7. A plastic reinforced container according to claim 1 wherein said top wall of said channel has a series of quadrilateral openings extending therethrough, an inner lengthwise edge of said openings is coplanar with said inner side wal of said channel, and the width of said openings is less than the width of said reinforcing ring.

8. A plastic reinforced container according to claim 5 wherein said top wall of said channel has a series of quadrilateral openings extending therethrough, an inner lengthwise edge of said openings is coplanar with said inner side wall of said channel, and the width of said openings is less than the width of said reinforcing ring.

9. A plastic reinforced container according to claim 8 wherein each quadrilateral opening corresponds in location to a respective resilient spaced discrete projection disposed on said top wall of said channel, and the length of the outer lengthwise edge of said openings is substantially equal to the length of said resilient spaced discrete projections and is shorter than the length of said inner lengthwise edge of said openings.

10. A plastic reinforced container according to claim 1 wherein said reinforcing ring extends totally around said outer periphery of said container.

11. A plastic reinforced container according to claim 1 wherein said container is a milk crate.

12. A plastic reinforced container according to claim 1 wherein said securing means is molded with said side panels.

13. A plastic reinforced container according to claim 1 wherein said reinforcing ring has a substantially uniform cross section.

14. A plastic reinforced container according to claim 13 wherein said reinforcing ring has a substantially circular cross section.

15. A plastic reinforced container comprising:
   a quadrilateral bottom panel;
   four side panels extending upwardly from said bottom panel and having top edges defining a top opening into said container;
   a reinforcing ring having a substantially circular cross section extending around at least a portion of the outer periphery of said top container adjacent said top edges; and
   securing means integrally formed and molded with said side panels for securing said reinforcing ring to said side panels, wherein said securing means comprises a peripheral outwardly facing channel disposed below said top edges, said channel comprising a top wall, a bottom wall, an inner said wall, and a plurality of resilient discrete projections integrally formed and molded with both said top wall and said bottom wall of said channel and partially obstructing the opening into said channel, said projections formed on said top wall of said channel being aligned with and opposing said projections formed on said bottom wall of said channel;
   wherein said reinforcing ring is free of projections that engage said top, bottom, and inner side walls and said resilient spaced discrete projections of said channel, and said reinforcing ring is snap-actingly receivable within said channel behind said projections.

16. A plastic reinforced cart comprising:
a cart frame having wheels;
a plastic basket attached to said cart frame, said plastic basket comprising three upright panels including two side panels and a front panel, and a bottom panel, all of which are attached to each other and have a top edge forming a top opening;
a reinforcing ring extending around at least a portion of the outer periphery of said basket adjacent said top edges; and
securing means integrally formed with said upright panels for securing said reinforcing ring to said upright panels;
wherein said reinforcing ring is free of projections that engage said securing means;
wherein said securing means comprises a peripheral outwardly facing channel disposed below said top edges, said channel comprising a top wall, a bottom wall, an inner side wall, and at least one projection integrally formed with said channel and partially obstructing the opening into said channel;
wherein said reinforcing ring is free of projections that engage said top, bottom, and inner side walls of said channel;
wherein said reinforcing ring is snap-actingly receivable within said channel behind said projection; and
wherein said channel comprises a plurality of discrete projections.

17. A plastic reinforced cart according to claim 16 wherein said reinforcing ring is totally receivable within said channel.

18. A plastic reinforced cart according to claim 16 wherein said projections are resilient and are integrally formed on both said top wall and said bottom wall of said channel.

19. A plastic reinforced cart according to claim 16 wherein the clearance past said projections for passage of said reinforcing ring into said channel is not greater than 65% of the height of said reinforcing ring.

20. A plastic reinforced cart according to claim 18 wherein the projections formed on said top wall of said channel are aligned and oppose the projections formed on said bottom wall of said channel.

21. A plastic reinforced cart according to claim 20 wherein the clearance between each pair of opposed projections is not greater than 65% of the height of said reinforcing ring.

22. A plastic reinforced cart according to claim 16 wherein said top wall of said channel has a series of quadrilateral openings extending therethrough, an inner lengthwise edge of said openings is coplanar with said inner side wall of said channel, and the width of said openings is less than the width of said reinforcing ring.

23. A plastic reinforced cart according to claim 20 wherein said top wall of said channel has a series of quadrilateral openings extending therethrough, an inner lengthwise edge of said openings is coplanar with said inner side wall of said channel, and the width of said openings is less than the width of said reinforcing ring.

24. A plastic reinforced cart according to claim 23 wherein each quadrilateral opening corresponds in location to a respective resilient spaced discrete projection disposed on said top wall of said channel, and the length of the outer lengthwise edge of said openings is substantially equal to the length of said resilient space discrete projections and is shorter than the length of said inner lengthwise edge of said openings.

25. A plastic reinforced cart according to claim 16 wherein said reinforcing ring extends totally around said outer periphery of said basket.

26. A plastic reinforced cart according to claim 16 wherein said cart is a shopping cart.

27. A plastic reinforced cart according to claim 16 wherein said securing means is molded with said upright panels.

28. A plastic reinforced cart according to claim 16 wherein said reinforcing ring has a substantially uniform cross section.

29. A plastic reinforced cart according to claim 28 wherein said reinforcing ring has a substantially circular cross section.

30. A plastic reinforced cart comprising:
a cart frame having wheels;
a plastic basket attached to said cart frame, said plastic basket comprising three upright panels including two side panels and a front panel, and a bottom panel, all of which are attached to each other and have a top edge forming a top opening;
a reinforcing ring having a substantially circular cross section extending around at least a portion of the outer periphery of said basket adjacent said top edges; and
securing means integrally formed with said upright panels for securing said reinforcing ring to said upright panels, wherein said securing means comprises a peripheral outwardly facing channel disposed below said top edges, said channel comprising a top wall, a bottom wall, an inner side wall, and a plurality of resilient discrete projections integrally formed and molded with both said top wall and said bottom wall of said channel and partially obstructing the opening into said channel, said projections formed on said top wall of said channel being aligned with and opposing said projections formed on said bottom wall of said channel;
wherein said reinforcing ring is free of projections that engage said top, bottom, and inner side walls and said resilient spaced discrete projections of said channel, and said reinforcing ring is snap-actingly receivable within said channel behind said projections.

31. A reinforced container comprising:
a plastic container including a bottom panel and a plurality of plastic generally upright panels connected to said bottom panel, said generally upright panels having top edges defining a plastic container top opening;
a securing channel disposed generally along said top opening, defining an elongated, outwardly-facing channel opening, and integrally molded with at least one of said generally upright panels;
a retainer projection integrally molded with said securing channel and positioned to partially obstruct said channel opening; and
an elongated reinforcing ring snap-fit into said securing channel through said channel opening and retained in said securing channel at least partially by said retaining projection.

32. The reinforced container of claim 31 wherein said securing channel comprises a top wall, a bottom wall, and an inner side wall connected to and extending between said top and bottom walls, and said retainer projection is formed on one said top and bottom walls.

33. The reinforced container of claim 31 wherein said retainer projection comprises a first retainer projection formed on said top wall, and further comprising a second retainer projection integrally molded on said bottom wall and positioned to partially obstruct said channel opening.

34. The reinforced container of claim 33 wherein said first and second retainer projections are resilient.

35. The reinforced container of claim 33 wherein said first and second retainer projections define a clearance therebetween for passage of said reinforcing ring into said securing channel, said clearance being not greater than sixty-five percent of the height of said reinforcing ring.

36. The reinforced container of claim 33 wherein said first and second retainer projections are horizontally aligned.

37. The reinforced container of claim 31 wherein said retainer projection comprises a plurality of discrete retainer projections spaced along said channel opening.

38. The reinforced container of claim 31 wherein said securing channel has a channel top wall, and said channel top wall has a quadrilateral opening extending therethrough.

39. The reinforced container of claim 38 wherein said securing channel has an inner side wall, said quadrilateral opening has an inner lengthwise edge which is co-planar with said inner side wall, said opening having its width being less than the width of said reinforcing ring.

40. The reinforced container of claim 39 wherein said quadrilateral opening has its length of its outer lengthwise edge being substantially equal to the length of said retainer projection and is shorter than the length of said inner lengthwise edge of said opening.

41. The reinforced container of claim 31 wherein said reinforcing ring has a substantially uniform cross section through its length.

42. The reinforced container of claim 31 wherein said reinforcing ring has a substantially circulated cross section throughout its entire length.

43. The reinforced container of claim 31 wherein said reinforcing ring is free of projections that engage said securing channel.

44. The reinforced container of claim 31 wherein said reinforcing ring extends totally around the outer periphery of said plastic container.

45. The reinforced container of claim 31 further comprising wheels, and a cart frame attached to said wheels and to said plastic container.

46. The reinforced container of claim 31 wherein said bottom panel and said container top opening are both quadrilateral.

47. The reinforced container of claim 46 wherein said bottom panel and said container top opening are both rectangular.

48. The reinforced container of claim 31 wherein said container top opening defines a trapezoid.

49. The reinforced container of claim 31 wherein said securing channel is disposed adjacent to said top edges.

50. The reinforced container of claim 31 wherein said reinforcing ring comprises a round wire whose ends are welded together to define a continuous ring extending around said container top opening.

51. The reinforced container of claim 31 wherein said bottom panel is rectangular, and said generally upright panels are disposed perpendicular to said bottom panel to thereby with said bottom panel define a crate.

52. The reinforced container of claim 31 wherein said bottom panel comprises a rectangular plastic bottom panel.

* * * * *

UNITED STATES PATENT AND TRADEMARK OFFICE
CERTIFICATE OF CORRECTION

PATENT NO. : 4,865,338

DATED : September 12, 1989

INVENTOR(S) : Houston Rehrig

It is certified that error appears in the above-identified patent and that said Letters Patent is hereby corrected as shown below:

On the front page, item 73 showing the Assignee as "Rehrig International, Inc., Richmond, Va." should show the Assignees as --Rehrig International, Inc., Richmond, Va.; Rehrig Pacific Co., Inc., Los Angeles, Calif.--.

Signed and Sealed this

Seventh Day of January, 1992

*Attest:*

HARRY F. MANBECK, JR.

*Attesting Officer*      *Commissioner of Patents and Trademarks*